United States Patent [19]

Nazanin et al.

[11] Patent Number: 5,625,683

[45] Date of Patent: Apr. 29, 1997

[54] METHOD OF AND TELEPHONE WITH CALL-REMINDING AND AUTO-DIALING

[75] Inventors: Victor Nazanin, Skokie; John A. Kalenowsky, Palatine; Donald C. Kordich, Grayslake, all of Ill.

[73] Assignee: Motorola, Inc., Schaumburg, Ill.

[21] Appl. No.: 621,851

[22] Filed: Mar. 25, 1996

[51] Int. Cl.[6] .................................................. H04M 1/26
[52] U.S. Cl. .......................... 379/355; 379/354; 379/396; 379/419
[58] Field of Search .............................. 379/355, 67, 69, 379/352, 354, 37, 40, 110, 51, 396, 419, 387

[56] References Cited

U.S. PATENT DOCUMENTS

| Re. 34,422 | 10/1993 | Aihara | 395/144 |
|---|---|---|---|
| 3,504,121 | 3/1970 | Riley | 379/69 |
| 3,999,050 | 12/1976 | Pitroda | 235/152 |
| 4,354,260 | 10/1982 | Planzo | 368/10 |
| 4,475,013 | 10/1984 | Lee et al. | 379/355 |
| 4,481,382 | 11/1984 | Villa-Real | 379/61 |
| 4,737,981 | 4/1988 | Hoberman et al. | 379/112 |
| 4,782,521 | 11/1988 | Bartlett et al. | 379/354 |
| 4,872,005 | 10/1989 | DeLuca et al. | 340/825.44 |
| 4,969,180 | 11/1990 | Watterson et al. | 379/58 |
| 5,247,438 | 9/1993 | Subas et al. | 364/400 |
| 5,317,626 | 5/1994 | Jaynes et al. | 379/67 |

FOREIGN PATENT DOCUMENTS

| 61-144953 | 7/1986 | Japan | 379/69 |

OTHER PUBLICATIONS

Motorola, Inc., *StarTAC™ User Manual*, 1995, pp. 108–109.

*Primary Examiner*—Krista M. Zele
*Assistant Examiner*—Scott L. Weaver
*Attorney, Agent, or Firm*—Donald C. Kordich

[57] ABSTRACT

A time-to-call and corresponding telephone number are stored in a memory (207) of a radiotelephone (100). The radiotelephone reminds a user that it is time to place a call by emitting a noise through a speaker (105) when a time-of-the-day is equal to or later than the time-to-call. The radiotelephone determines if the radiotelephone is powered on before displaying the telephone number on a display (111). Upon viewing the displayed telephone number, the user can cancel the call or confirm placement of the call to the telephone number by pressing a key (109) or key combination. If confirmed, the radiotelephone automatically dials the telephone number. When a time duration passes before the radiotelephone is powered on, the call is terminated, or the call is canceled, the user has the option to delete the telephone number and corresponding time-to-call from the memory, or change the time-to-call.

13 Claims, 2 Drawing Sheets

METHOD OF AND TELEPHONE WITH CALL-REMINDING AND AUTO-DIALING

FIELD OF THE INVENTION

The present invention relates generally to the field of telephones, and more particularly to reminding a user to make a call and automatically placing the call. Although the invention is subject to a wide range of applications, it is especially suited for use in a radio or cellular telephone, and will be particularly described in that connection.

BACKGROUND OF THE INVENTION

Personal computers, pocket organizers, and wrist watches are known to have a reminder feature that emits a sound at a time programmed by the user. In addition, some of these devices may accept as input from the user a description of the task that is to be performed at the programmed time, and display the task description to the user at the programmed time.

If the task is to place a phone call to a telephone number, some pocket organizers, and some personal computers equipped with a modem and communications software, can generate dual-tone, multi-frequency signals or pulses representing the certain number. But placing a call in this manner requires coupling with a landline telephone.

Telephones are known to have an automatic dial feature. A user presses a single key or key combination, which represents a stored telephone number, and the stored telephone number is automatically dialed. Telephones, however, don't have an automatic dial feature that is integral with a reminder feature.

A need therefore exists for a telephone that alerts a user at a preprogrammed time to place a call, and allows the user to automatically place the call.

DETAILED DESCRIPTION OF THE PREFERRED EMBODIMENTS

The telephone described herein reminds a user to place a call to a telephone number, and allows the user to automatically place the call, defer the reminder to a later time, or eliminate the reminder.

These advantages over the conventional apparatus for both reminding the user to place a call and making the call are principally provided by a telephone with integrated call-reminder and auto-dial features.

Reference will now be made in detail to a telephone configured according to the present invention.

Figure 1:
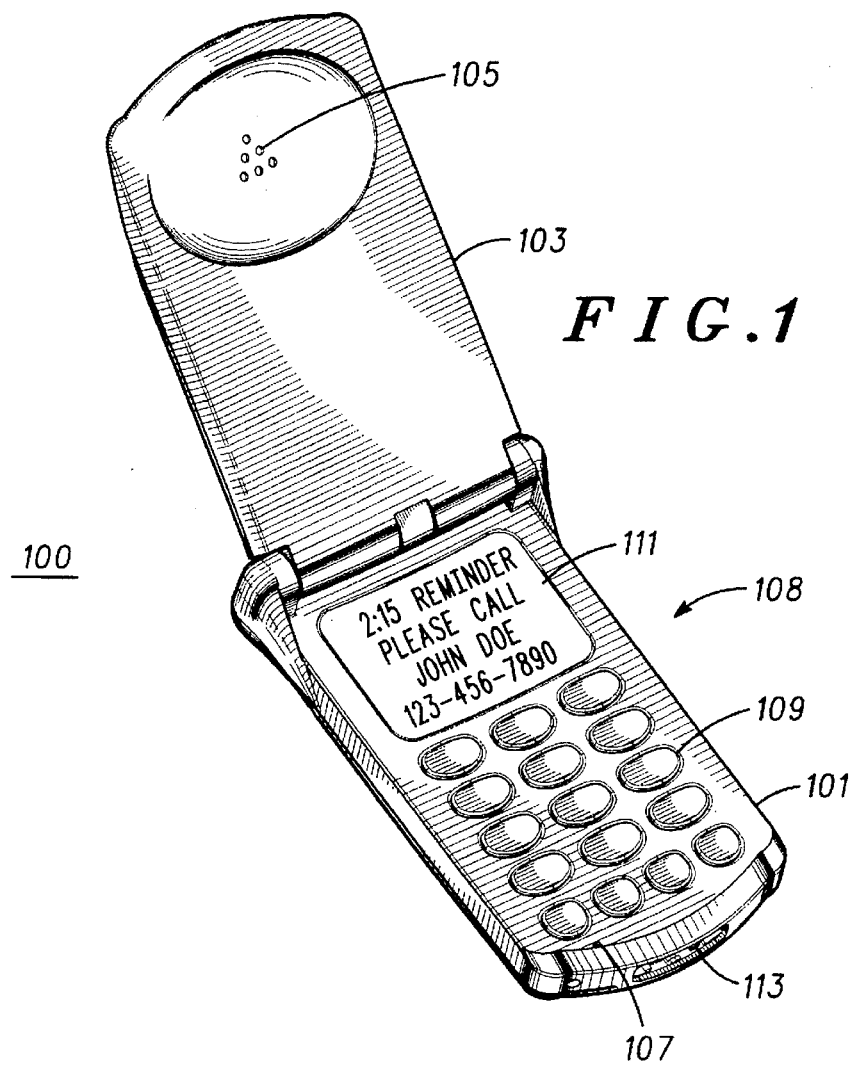
FIG. 1 is an isometric view of a personal, handheld radiotelephone that can employ the invention.

FIG. 1 is an isometric view of a personal, handheld radiotelephone 100 that can employ the invention. This figure illustrates, among other things, a bottom housing 101 rotatably attached to a top housing 103. Both housings contain electronic circuitry. Bottom housing 101 has protruding through its front surface a port for a microphone 107, a keypad 108 having keys 109, and a display 111. Top housing 103 has protruding through its front surface a plurality of apertures for a speaker 105.

Keypad 108 can have a 10-digit numeric keypad as well as control keys such as POWER, SEND, and END. Furthermore, the keys can be programmed, which when a key or key combination is depressed, causes radiotelephone 100 to carry out prescribed functions.

Figure 2:
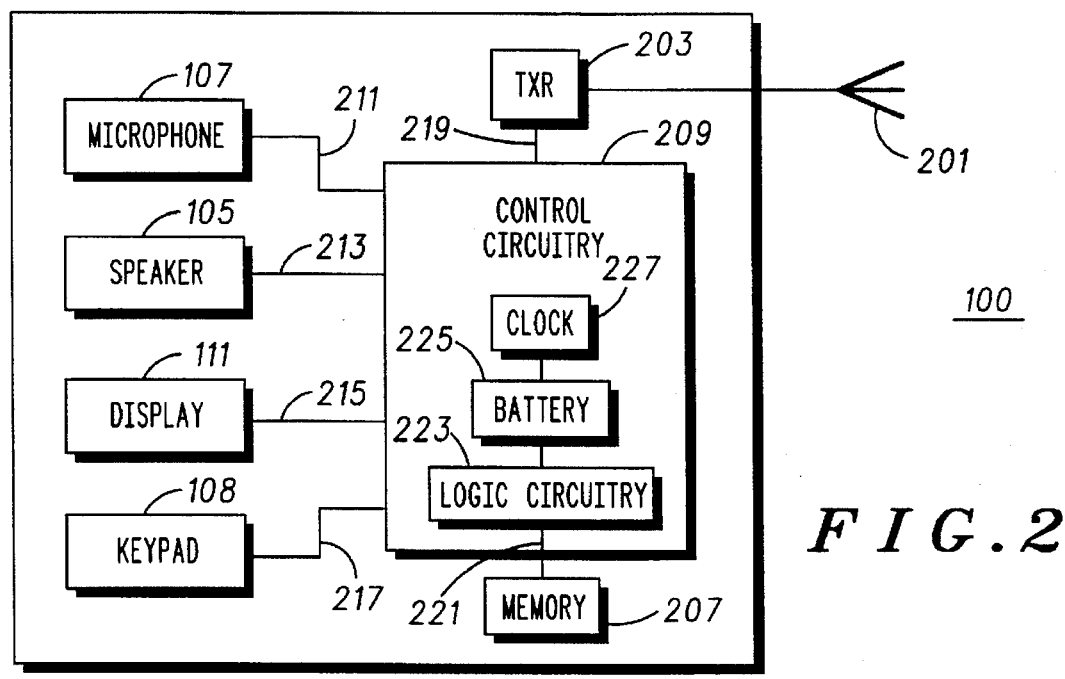
FIG. 2 is a general electrical schematic of the personal, handheld radiotelephone shown in FIG. 1.

FIG. 2 is a general electrical schematic of radiotelephone 100 shown in FIG. 1. This figure illustrates microphone 107, speaker 105, display 111, and keypad 108 coupled with a control circuitry 209 via lines 211,213,215,217, respectively. Further, a nonvolatile memory 207 and a transceiver 203 are coupled with control circuitry 209 via lines 219,221, respectively. Control circuitry 209 includes a clock 227 that can be set to the time-of-the-day and keeps track of the time-of-the-day, a logic circuitry 223, and a battery 225 that uninterruptedly powers clock 227 and logic circuitry 223.

The software code containing the instructions executed by control circuitry 209, and particularly logic circuitry 223, resides in memory 207. According to the instructions, and in response to inputs from keypad 108 and signals received via an antenna 201 and transceiver 203, control circuitry 209 controls the operation of radiotelephone 100. A user can, by using keypad 108, power on and power off the radiotelephone, set the clock to the correct time-of-the-day, input a plurality of telephone numbers and corresponding times-to-call, and a default time-to-call and a time duration (described later). The time-to-call can be inputted in a hour and minute format. The telephone numbers, times-to-call, default time, and time duration are stored in memory 207.

Figure 3:
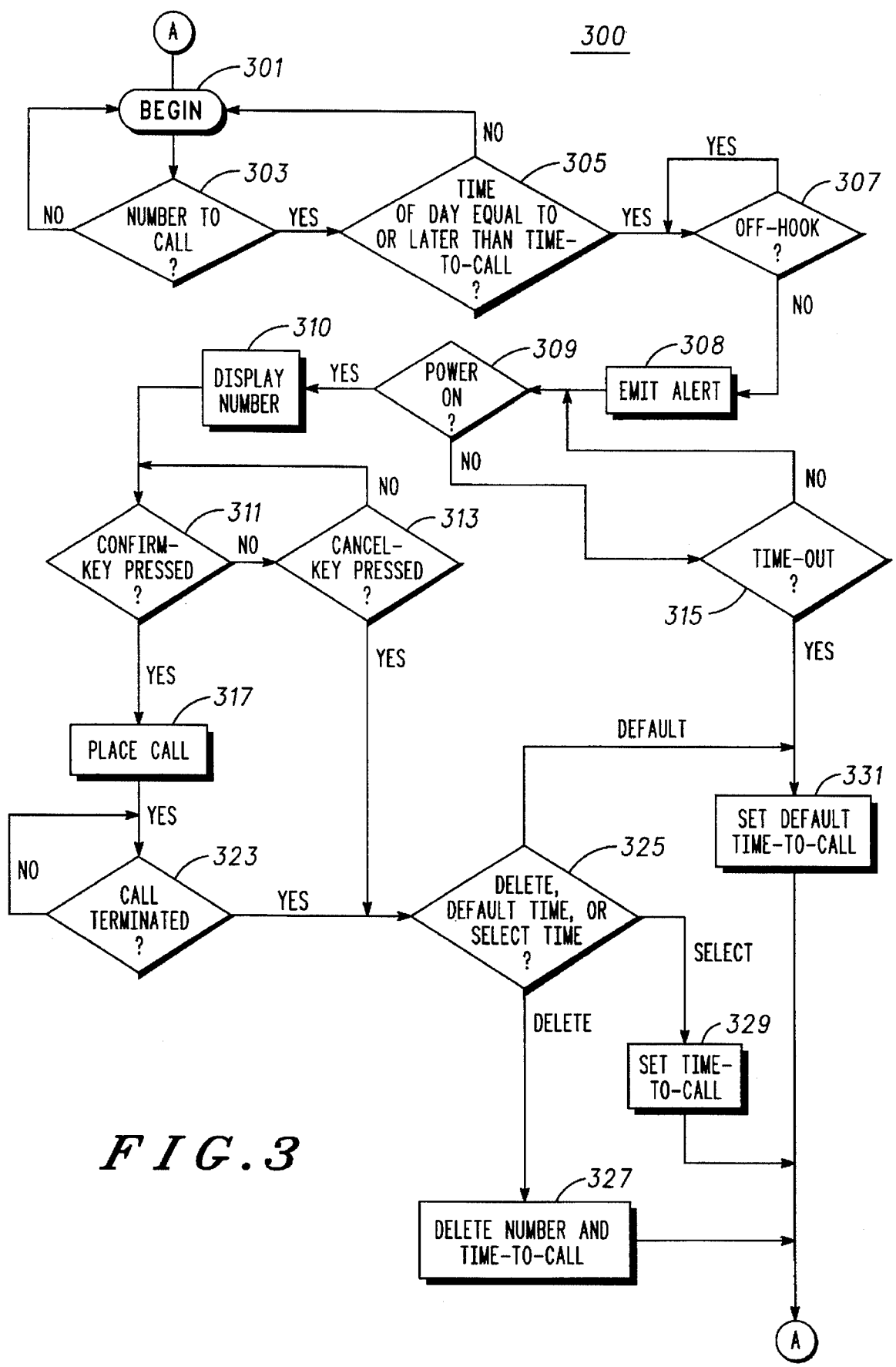
FIG. 3 is a flow chart showing the operation of the radiotelephone according to the present invention.

The method of use and operation of the radiotelephone constructed as described above will be now be describe with reference to FIG. 3, which is a flow chart showing the operation, or process 300, of the radiotelephone according to the present invention.

Process 300 begins at step 301. Logic circuitry 223 periodically scans allocated addresses in memory 207 to determine if there is telephone number that has been stored for calling. (Step 303.) When no telephone number has been found, the process reverts back to the beginning. When a telephone number is found, logic circuitry 223 determines if the current time-of-the-day is equal to or later than the time-to-call. (Step 305.) When it is not past the time-to-call, the process reverts back to the beginning.

When the current time-of-the-day is equal to or later than the time-to-call, to ensure the user won't be reminded to place a call while the user is already placing or carrying on a call, logic circuitry 223 determines if radiotelephone 100 is off-hook. (Step 307.) When off-hook, the process continues to check for off-hook. When not off-hook, logic circuitry 223 causes an alert device to emit a human-detectable alert, such as, speaker 105 to emit an audible sound, (step 308), that reminds the user that it is time to place a call.

After the sound is emitted, logic circuitry 223 determines whether radiotelephone 100 is powered on. (Step 309.) When the radiotelephone is not powered on, logic circuitry 223 continues to check for power-on. Power-on can occur, for example, when the radiotelephone is powered off at the time the audible sound is emitted and then the user, who is within a range which the audible sound can be heard, presses the POWER-key to turn the radiotelephone on.

When the radiotelephone is not powered on, e.g., when the user is not within the range which the audible sound can be heard, and consequently is not aware that action is necessary, or the user does not take action in response to hearing the audible sound by pressing the POWER-key, logic circuitry 223 determines whether a preprogrammed time duration has elapsed. (Step 315.) The time duration can begin when logic circuitry 223 initially determines the radiotelephone is powered on. When the preprogrammed time duration has elapsed without the radiotelephone being powered on, the time-to-call is changed to a new time based on a preset default time, (step 331), such as 15 minutes forward from the stored time-to-call, and the process begins again. Consequently, the speaker will emit a sound every 15 minutes until the user responds by turning the radiotelephone on.

When the radiotelephone is powered on, the telephone number corresponding to the time-to-call that was found to be equal to or earlier than the time-of-day, is displayed on display 111. (Step 310.) There are two possibilities at this stage in the process. The user can press a key or key combination representing the function CONFIRM (CONFIRM-key), (step 311), or, alternatively press a key or key combination representing the function CANCEL (CANCEL-key), (step 313.)

The user confirms placing the call by pressing the CONFIRM-key. When the CONFIRM-key is pressed, logic circuitry 223 causes radiotelephone 100 to automatically dial the stored telephone number to place the call. (Step 317.) Logic circuitry 223 determines if the call is terminated. (Step 323.) A call can be terminated by pressing the END-key, e.g., in response to a busy signal, an unanswered call, a recorded message, or an end of conversation with a called party. When the call is not terminated, logic circuitry 223 continues to determine if the call is terminated.

When the call is terminated, or when the user presses the CANCEL-key instead of the CONFIRM-key to inform the radiotelephone not to place the call, logic circuitry 223 presents options to the user via display 111 of deleting the telephone number and corresponding time-to-call from memory, changing the time-to-call to a default time-to-call, or changing the time-to-call to a user-selected time-to-call. (Step 325.) The user can choose the options by pressing the preprogrammed keys or key combinations corresponding to DELETE, DEFAULT, or SELECT, respectively. When the user does not desire to be reminded to place the call again, the user may press the DELETE-key. When the DELETE-key is chosen, the telephone number and corresponding time-to-call are erased from memory 207, (step 327), and the process begins again. When the user desires to be reminded to place the call again, the user can press the DEFAULT-key or the SELECT-key. When the DEFAULT-key is chosen, the time-to-call is changed to a preprogrammed default time, (step 331), and the process begins again. When the SELECT-key is chosen, the user is prompted to input a new time-to-call for the telephone number, (step 329,), and the process begins again.

Those skilled in the ad will recognize that various modifications and variations can be made in the radiotelephone of the present invention without departing from the scope or spirit of this invention. As examples, the telephone can vibrate or emit a light rather than emit a sound to alert the user to place a call; a speaker separate from speaker 105 can be used to emit the alert sound; the called party's name can be inputted and displayed rather than the telephone number, and the radiotelephone can look up the telephone number by matching the name to the telephone number stored in a repertoire directory stored in a memory; input information can be input via a plug 113 (see FIG. 1), which is coupled with control circuitry 209, rather than the keyboard; the time-to-call can be entered as a period of time starting at the current time-of-the-day then converted to an hour and minute format, rather than inputting the time-to-call in the hour and minute format; a call can be terminated automatically, e.g., when a busy signal is detected; and the time-to-call can include a day-of-the-week and/or date and the clock can keep track of the day of the week and/or date.

In summary, the telephone configured in accordance with the present invention has built-in, integral call reminder and autodial features that provide the advantage of one electronic device being able to both remind the user when to place a call and place the call. Moreover, the radiotelephone can defer the reminder to a later time, or eliminate the reminder for the call.

What is claimed is:

1. A method of resetting a stored time-to-call a corresponding telephone number, the method, performed by a telephone, comprising the steps of:

determining if a time-of-the-day is equal to or later than the stored time-to-call;

determining if the telephone is powered on when the time-of-the-day is equal to or later than the stored time-to-call;

determining if a time duration has elapsed while the telephone is not powered on; and automatically changing the stored time-to-call to a predetermined later time-to-call after the time duration has elapsed.

2. The method of claim 1 further comprising the steps of:

determining if the telephone is off-hook when the time-of-the-day is equal to or later than the stored time-to-call; and emitting a human-detectable alert when the telephone is not off-hook.

3. The method of claim 2, wherein the step of emitting a human-detectable alert includes the substep of emitting an audible sound.

4. The method of claim 1 further comprises the step of displaying information representing the telephone number when the telephone is powered on.

5. The method of claim 4 further comprises the steps of:

determining whether to make a call to the telephone number or to cancel the call;

automatically dialing the telephone number in response to determining to make the call;

terminating the call after the call is made;

displaying, in response to termination of the call or to cancellation of the call, information representing options of changing the stored time-to-call to a default time-to-call or to a user-selected time-to-call; and determining whether to change the stored time-to-call to a default time-to-call or to a user-selected time-to-call.

6. The method of claim 4 wherein the information representing the telephone number is the numeric digits of the telephone number.

7. The method of claim 2 wherein the step of determining if the telephone is off-hook is repeated until the telephone is not off-hook.

8. A method of resetting a stored time-to-call a corresponding telephone number, the method, performed by a telephone, comprising the steps of:

determining if a time-of-the-day is equal to or later than the stored time-to-call;

displaying information representing the telephone number when the time of the day is equal to or later than the stored time-to-call;

determining whether to make a call to the telephone number or to cancel the call;

automatically dialing the telephone number in response to determining to make the call;

termination the call after the call is made;

displaying, in response to termination of the call or to cancellation of the call, information representing options of changing the stored time-to-call to a default time-to-call or to a user-selected time-to-call; and determining whether to change the stored time-to-call to a default time-to-call or to a user-selected time-to-call.

9. The method of claim 8 further comprising the steps of:

determining if the telephone is powered on when the time-of-the-day is equal to or later than the stored time-to-call;

determining if a time duration has elapsed while the telephone is not powered on; and automatically changing the stored time-to-call to a predetermined later time-to-call after the time duration has elapsed.

10. A telephone comprising:

a memory for storing a plurality of telephone numbers and a plurality of time-to-call, each telephone number of the plurality of telephone numbers associated with a corresponding time-to-call of the plurality of time-to-call;

a control circuitry, coupled with the memory, for determining if a time-of-the-day is equal to or later than any one of the plurality of time-to-call, determining if the telephone is powered on when the time-of-the-day is equal to or later than a one of the plurality of time-to-call, determining if a time duration has elapsed while the telephone is not powered on, and automatically changing the one of the plurality of time-to-call to a predetermined later time-to-call after the time duration has elapsed.

11. The telephone of claim 10 further comprises:

the control circuitry further determines if the telephone is off-hook when the time-of-the-day is equal to or later than any one of the plurality of the time-to-call;

an alert device, coupled with the control, circuitry, for emitting a human-detectable alert when the telephone is not off-hook.

12. A telephone comprising:

a memory for storing a plurality of telephone numbers and a plurality of time-to-call, each telephone number of the plurality of telephone numbers having a corresponding time-to-call of the plurality of time-to-call;

a control circuitry, coupled with the memory, for determining if a time-of-the-day is equal to or later than any one of the plurality of time-to-call; and a display, coupled with the control circuitry, for displaying information representing a telephone number corresponding to a one of the plurality of time-to-call that is equal to or earlier than the time-of-the-day;

the control circuitry further determines whether to make a call to the telephone number corresponding to the one of the plurality of the time-to-call or to cancel the call, automatically dials the telephone number in response to determining to make the call, and terminates the call after the call is made;

the display further displays, in response to termination of the call or to cancellation of the call, information representing options of changing the one of the plurality of the time-to-call to a default time-to-call or to a user-selected time-to-call;

the control circuitry further determines whether to change the one of the plurality of the time-to-call to a default time-to-call or to a user-selected time-to-call.

13. The telephone of claim 12 wherein the control circuitry further determines if the telephone is powered on when the time-of-the-day is equal to or later than any of the plurality of time-to-call, determines if a time duration has elapsed while the telephone is not powered on, and automatically changes the one of the plurality of time-to-call to a predetermined later time-to-call after the time duration has elapsed.

* * * * *